Patented Jan. 9, 1923.

1,441,726

UNITED STATES PATENT OFFICE.

HERMAN HEUSER, OF EVANSTON, ILLINOIS.

PREPARATION OF LOW-ALCOHOLIC AND NONALCOHOLIC BEVERAGES.

No Drawing.   Application filed February 18, 1920.   Serial No. 359,489.

*To all whom it may concern:*

Be it known that I, HERMAN HEUSER, a citizen of the United States, residing at Evanston, in the county of Cook and State of Illinois, have invented a new and useful Improvement in Preparation of Low-Alcoholic and Nonalcoholic Beverages, of which the following is a specification.

The present invention relates to the preparation of beverages of low alcoholic content or substantially free from alcohol, and more particularly of such beverages prepared from cereal infusions or fruit juices and having the taste, flavor, aroma and other beverage characteristics of naturally fermentive beverages, such as beer, ale, porter, wine, etc.

In the manufacture of such beverages, cereal worts or infusions may be subjected to fermentation and the alcohol removed therefrom by boiling or evaporation. Thus a beer may be made by the fermentation of a malt-cereal wort and the beer boiled to remove its alcohol or dealcoholize it. This dealcoholization may be effected by boiling at ordinary temperatures, or if desired to minimize its deleterious effects upon the beverage stock, it may be carried out under controlled conditions of vacuum to reduce the temperature of dealcoholization to, say, 140° F. or even less. After dealcoholization, further steps may be taken to restore to the dealcoholized beverage stock, natural fermentation, flavor, taste, aroma and other characteristics without supplying thereto alcohol, except in inconsequential amounts, for example, by carrying out in the dealcoholized beverage a secondary fermentation under conditions promoting the propagative action of yeast, as described in my prior Patent No. 1,302,551 of May 6, 1919.

In accordance with the present process, there is added to the dealcoholized beverage after the dealcoholization and attempering of the latter to a temperature suitable for proteolytic action. say from 90 to 150° F., or during dealcoholization, if a temperature of 150° F. is not exceeded during that process, a suitable quantity of proteolytic enzyme active in the beverage stock, which is slightly acid in character. When the stock is boiled, or otherwise agitated during dealcoholization, it is preferred that the addition of the enzyme be made after dealcoholization. A suitable enzyme for this purpose is the peptic enzyme pepsin, which may be added in the proportions of 1 to 6 grams of pepsin having a rated activity of 1 to 3000 per barrel of beverage stock. Other peptic enzymes may be utilized, such as papain, bromelin, or the peptase derived from malt, or tryptic enzymes may be utilized, such as the endotryptase derived from the autolysis of yeast at suitable temperatures.

During the de-alcoholization process, certain of the nitrogenous constituents of the beverage stock, and particularly the albuminoids, tend to coagulate and to precipitate out from the stock. These compounds are of importance in the development of body and foam holding capacity in the beverage, which is seriously impaired in these characteristics by their loss. By the addition of a proteolytic enzyme, such as pepsin, as described hereinbefore, these compounds are peptonized or proteolyzed, being thereby converted into forms soluble in the beverage and aiding in restoring thereto natural beverage characteristics. Where the pepsin or other enzyme is added subsequently to the de-alcoholizing step, the de-alcoholized beverage is held at a temperature of 90°–150° F. for from 1 to 5 hours, depending upon the turbidity of the stock. If it is not desired to further perfect the beverage, the latter may be cooled to a temperature of 32–34° F. and held at such temperature for, say, 3 days, thereby precipitating all matters contained therein coagulable by the cold, and may then be filtered and packaged in the customary manner.

It is preferred, however, that, after the treatment of the beverage stock, a natural beverage taste, flavor and aroma be further restored or rebuilt therein by producing therein a yeast fermentation under conditions aiding the propagation of the yeast, for example, by adding a small proportion of fermenting wort, say 5%, and permitting fermentation to proceed as described in my prior patent previously referred to. When a dealcoholized beverage not treated with a proteolytic enzyme, such as pepsin, in accordance with the present invention is so perfected it is found that the coagulation of the albuminoid matter of the stock during dealcoholization has removed from the beverage an important source of yeast food, thereby inhibiting the propagative activity of the yeast in the secondary or rebuilding fermentation. The addition of the pepsin or other proteolytic enzyme in accordance with the present invention, exerts an important influence in aiding the propagative activity of the yeast by converting the coagulable albuminoids into diffusible soluble forms and thereby rendering them available for use by the yeast.

It is found, however, that the pepsin, or other proteolytic enzyme added as hereinbefore described, to a dealcoholized beverage stock subsequently perfected by a rebuilding fermentation in accordance with the process of my prior patent previously referred to, may tend to produce a lack of stability and a tendency to turbidity in the completed beverage under the influence of light or of severe agitation, such as that incurred in freighting by railway. The enzyme may therefore be removed as completely as possible or its sensitiveness to such conditions materially decreased by the use of suitable precipitating means after the completion of the secondary beverage, for example, a tannic acid solution prepared by treating hops with a dextrin solution at a temperature below the boiling point of the solution, as described in my prior Patent 1,302,550 of May 6, 1919. In addition to the formation of a voluminous precipitate, which I believe contains substantially all of the pepsin or enzyme added, the solution imparts a desirable hop taste and flavor to the beverage. If desired, I may then add a small proportion of a suitable reducing agent, say 4 to 12 grams of potassium pyrosulfite or an equivalent quantity of a sulfite or of $SO^2$ to the beverage, thereby deoxygenating it and further aiding in the removal of albuminoid bodies and enzymes. When pepsin is added in the proportion hereinbefore described it may, if desired, be retained in the completed beverage and may be identified, for example by the edestin test.

After clarification of the beverage it is carbonated and prepared for packaging. I have found that additional colloid and albuminoid material may be removed and the beverage further stabilized by carbonating the beverage in bulk with vigorous agitation. After carbonation the beverage is clarified and is pasteurized and packaged in the usual manner. It is then not only chill-proof, but is proof against turbidity from light and agitation. This result is due, I believe, to the substantially complete removal therefrom of coagulable and precipitable compounds including the enzymes present or added to the beverage stock.

Although the use of pepsin has been specifically described above, other proteolytic enzymes, both peptic and tryptic in character or mixtures thereof may be utilized for the proteolytic conversion of the coagulable albuminoids during or after dealcoholization. Furthermore, I do not intend that the specific details of the process which I have recited nor the opinions or theories that I have expressed relative to the various reactions taking place are to be regarded as limitations upon the scope of the process.

What I claim as new and desire to secure by Letters Patent is:

1. The method of preparing beverage materials which comprises dealcoholizing a fermented beverage by the action of heat and supplying a proteolytic enzyme therein for converting into soluble form the nitrogenous compounds coagulable during the dealcoholization.

2. The method of preparing beverage materials which comprises dealcoholizing a fermented beverage liquid by the action of heat and supplying pepsin therein for converting into soluble form the nitrogenous compounds coagulable during the dealcoholization.

3. The method of preparing low or non-alcoholic beverages from fermented liquids which comprises de-alcoholizing the liquid, adding thereto a proteolytic enzyme, and maintaining the de-alcoholized liquid at a temperature of 90–150° F. for one to five hours.

4. The method of preparing low or non-alcoholic beverages from beer which consists in de-alcoholizing the beer, adding pepsin to the de-alcoholized beer and maintaining it at a temperature of 90–150° F. for one to five hours.

5. The process of manufacturing a low or non-alcoholic beverage having the taste, flavor and aroma of a natural fermented beverage which consists in dealcoholizing a fermented liquid, supplying therein a proteolytic enzyme whereby nitrogenous compounds coagulated during de-alcoholization are rendered soluble and subsequently producing a yeast fermentation therein under conditions favoring propagative action of the yeast.

6. The process of manufacturing a low or non-alcoholic beverage having the taste, flavor and aroma of a natural fermented beverage which consists in dealcoholizing beer, adding pepsin thereto and maintaining a temperature of 90–150° F. for one to five hours, and producing therein a secondary yeast fermentation without carbonating the beverage.

7. The process of manufacturing a low or non-alcoholic beverage having the taste, flavor and aroma of a natural fermented beverage which consists in de-alcoholizing beer, adding pepsin thereto and maintaining a temperature of 90–150° F. for one to five hours, and producing therein a secondary yeast fermentation without carbonating the beverage and removing from the beverage all coagulable compounds.

8. A beverage low in alcohol and containing the ingredients of beer not removed with its alcohol together with proteolytic conversion products of the coagulable albuminoids of the beer.

9. A beverage low in alcohol and containing the ingredients of beer not removed with its alcohol together with proteolytic conversion products of the coagulable albuminoids of the beer and a proteolytic enzyme.

HERMAN HEUSER.